United States Patent [19]

Reynolds

[11] Patent Number: 4,749,893

[45] Date of Patent: Jun. 7, 1988

[54] MAGNETICALLY ACTUATED ENGINE

[76] Inventor: Billy D. Reynolds, 6015 Debby Rd., Shelby, N.C. 28150

[21] Appl. No.: 885,527

[22] Filed: Jul. 14, 1986

[51] Int. Cl.$^4$ .............................................. H02K 33/00
[52] U.S. Cl. ........................................ 310/24; 310/34; 310/35
[58] Field of Search .................. 310/23, 24, 34, 35, 310/15

[56] References Cited

U.S. PATENT DOCUMENTS

| 538,351 | 4/1895 | Sabin | 310/24 |
|---|---|---|---|
| 1,932,146 | 10/1933 | Ruckelshaus | 310/34 X |
| 4,019,103 | 4/1977 | Davis | 310/24 X |
| 4,317,058 | 2/1982 | Blalock | 310/24 |
| 4,510,420 | 4/1985 | Sasso | 310/24 X |
| 4,523,114 | 6/1985 | Smith | 310/35 X |

Primary Examiner—Donovan F. Duggan
Attorney, Agent, or Firm—Rhodes, Coats & Bennett

[57] ABSTRACT

This invention is an engine with reciprocating piston slidingly mounted within a cylinder and connected to a rotatable shaft. The piston is driven back and forth within the cylinder by a pair of electromagnets to obtain rotary power. A secondary winding around one of the electromagnets produces an alternating current. An anti-arc relay is also provided to prevent burning of the high voltage contacts.

1 Claim, 4 Drawing Sheets

MAGNETICALLY ACTUATED ENGINE

FIELD OF INVENTION

The invention relates to engines and more particularly to magnetically actuated reciprocating engines.

BACKGROUND OF THE INVENTION

In the past, mechanical power generation has been accomplished primarily through the use of nuclear and organic fuel. Use of these fuels produce harmful by-products which pose severe health problems. In the case of organic fuels, exhaust gases are discharged into the atmosphere thereby polluting the same and contributing to respiratory ailments. The use of nuclear fuels produces radioactive waste, exposure to which can result in death, cancer and genetic disorders. Moreover, there exists a constant threat of spillage or leakage of radioactive waste into the environment which can render large areas uninhabitable for decades.

Further, known deposits of nuclear and organic fuels are being rapidly depleted so there is a great need for alternative sources of power.

SUMMARY AND OBJECTS OF THE INVENTION

The present invention takes advantage of electromagnetic forces to produce both mechanical and electrical power. A first electromagnet is housed within a reciprocating piston which is connected to a rotatable crankshaft. A second electromagnet is fixedly secured above the cylinder. When actuated, the electromagnets create an attractive force which pulls the piston upwardly within the cylinder. The upward movement of the piston causes the crankshaft to rotate.

A plurality of pistons acting in concert assures that the crankshaft will be continuously rotated.

Accordingly, it is an object of the present invention to provide a magnetically actuated reciprocating engine of the type having a reciprocating piston connected to a rotatable shaft.

Another object of the present invention is to provide a reciprocating engine which does not produce harmful by-products.

Another object of the present invention is to provide a reciprocating engine that produces both mechanical and electrical power.

Another object of the present invention is to provide a reciprocating engine which does not discharge pollutants into the atmosphere.

Another object of the present invention is to provide a reciprocating engine that may be constructed by retrofitting existing aluminum internal combustion engines.

Other objects and advantages of the present invention will become apparent and obvious from a study of the following description and accompanying drawings which are merely illustrative of such invention.

DETAILED DESCRIPTION OF THE INVENTION

Figure 3:
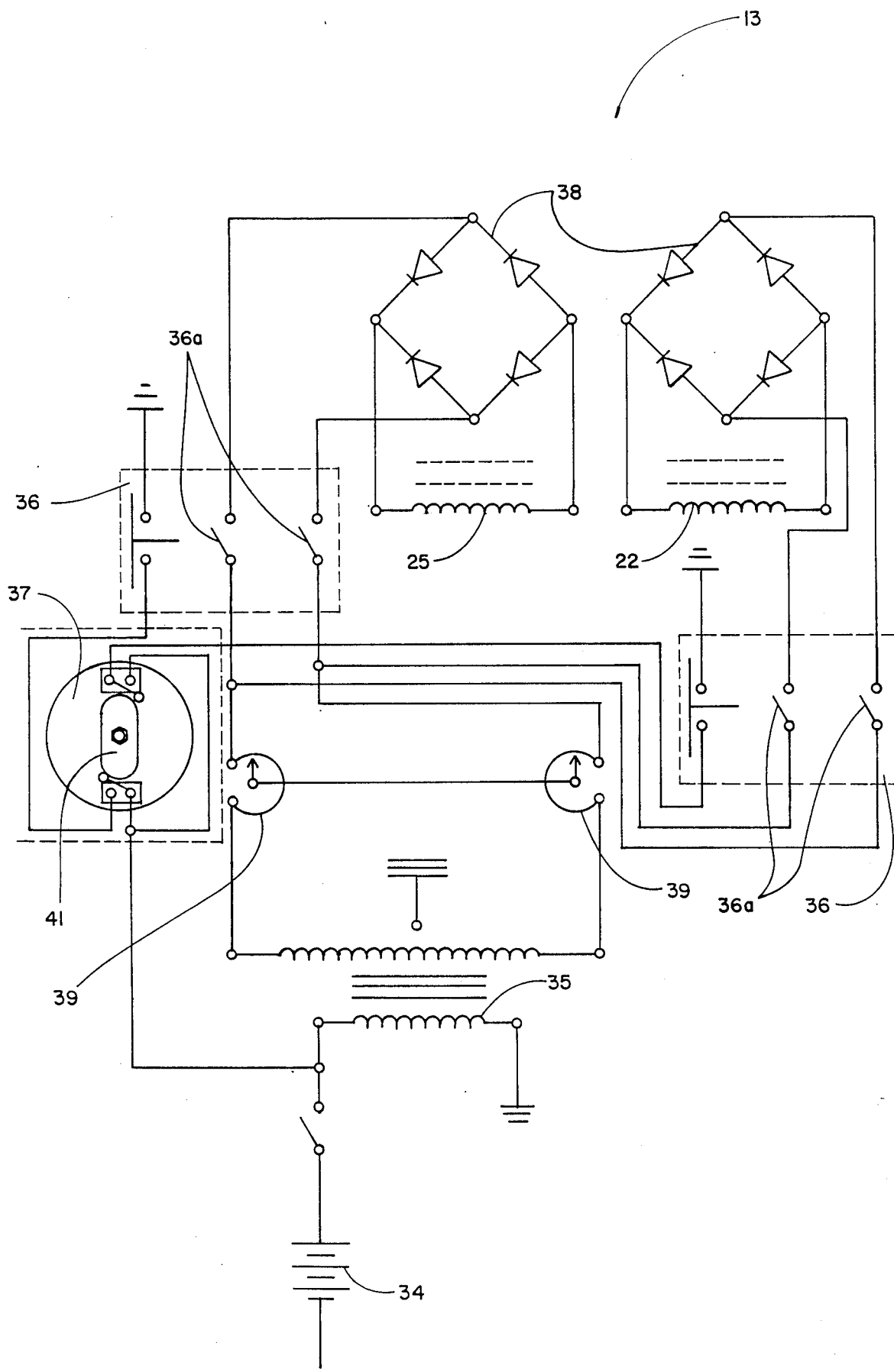
FIG. 3 is a schematic diagram of the magnetically actuated reciprocating engine.

Referring now to the drawings, the electromagnetic engine of the present invention is shown therein and indicated generally by the numeral 10. Viewing electromagnetic engine 10 in more detail, it is seen that the same includes an engine block assembly, indicated generally at 11, two head assemblies, indicated generally at 12, and a power distribution assembly, indicated generally at 13 (FIG. 3).

The engine block assembly 11 includes a V-type engine block 14 having a crankcase 15 and a pair of cylinder banks 16 disposed at an angle of approximately 90 degrees with respect to each other. The crankcase 15 houses a rotatable crankshaft 17 which is supported and secured by sealed grease-filled roller bearings (not shown) in the normal manner of conventional internal combustion engines. The crankcase 15 is cooled by forcing cool air through ports 23. A cover 24 encloses the lower end of crankcase 15 and provides a means of access into the same.

Each cylinder bank 16 includes a plurality of in-line cylinders 18 having non-conducting or insulating sleeves 19. A piston 20 is slidingly mounted within each cylinder 18 and is connected by a connecting rod 21 to a respective crankthrow on crankshaft 17. Thus, the reciprocating motion of the pistons 20 can be translated into rotating motion of the crankshaft 17 as in conventional internal combustion engines.

Each piston 20 houses an electromagnet 22 which reciprocates bach and forth with such piston. Power is supplied to the electromagnets 22 by a pair of conductors 19a embedded into the walls of the insulated sleeve 19 on opposite sides thereof. Contacts 19b, which are mounted on piston 20 and are electrically connected to electromagnet 22, continuously engage conductors 19a as piston 20 reciprocates back and forth within cylinder 18.

The head assemblies 12 include a plurality of electromagnets 25 (one for each cylinder) fixedly disposed above respective cylinders 18. The electromagnets 25 are contained in a housing structure 26 and are secured therein by bolts 27. The housing structure 26 includes a peripheral flange 28 through which bolts 29 extend to secure the housing structure 26 atop each cylinder bank 16. Spacers 29 are interposed between the housing structure 26 and the top of the cylinder bank 16 to provide for air movement within the cylinders 17 and to set the breakaway gap of the electromagnet 22 and electromagnet 25. When power is supplied to the electromagnets 25 and 22 their respective fields create an attractive force which tends to pull electromagnet 22 and its associated piston up in the cylinder.

The electromagnet 25 consists of a core 30 of soft iron or other magnetic material which possesses low retentivity and a coil 31 of wire having relatively low resistance such as copper wire. Coil 31 is hereinafter referred to as the primary coil 31.

A secondary coil 32 is wrapped around the windings of primary coil 31. When current is supplied to the primary coil 31 it produces a magnetic field, the flux lines of which link with the windings of the secondary coil 32. When the current through the primary coil 31 increases (as when power is supplied), the number of flux lines linking the secondary coil 32 will likewise increase thereby inducing a current in the secondary coil 32 in a direction opposite to the direction of current in the primary coil 31. When the current through the primary coil 31 decreases (as when power is interrupted) the number of flux lines linking the secondary coil 32 will decrease thereby inducing a current in the secondary coil 32 opposite to the current induced when power was supplied. Thus, an alternating current is produced in the windings of the secondary coil 32 which is directed to a operate virtually any electrical device.

The power distribution system (FIG. 3) includes a low voltage power source 34, high voltage anti-arc relays 36, and a low voltage power directing unit 37. The low voltage power source 34 can be a conventional rechargeable battery which is well known to those skilled in the art. It is contemplated that solar batteries may also be used when such become feasible.

The low voltage power source 34 supplies power to inverter 35. Inverter 35 generates and makes available high voltage alternating current to the anti-arc relay 36 which, when actuated by the low voltage power directing unit 37, directs the flow of high voltage to the electromagnets 25 and 22. Rectifiers 38 convert the high voltage alternating current back to direct current used by the electromagnets. A rheostat 39 provides a manual control of the high voltage current thereby allowing selection of the magnitude of high voltage being applied to the electromagnet 25 and electromagnet 22.

Figure 1:
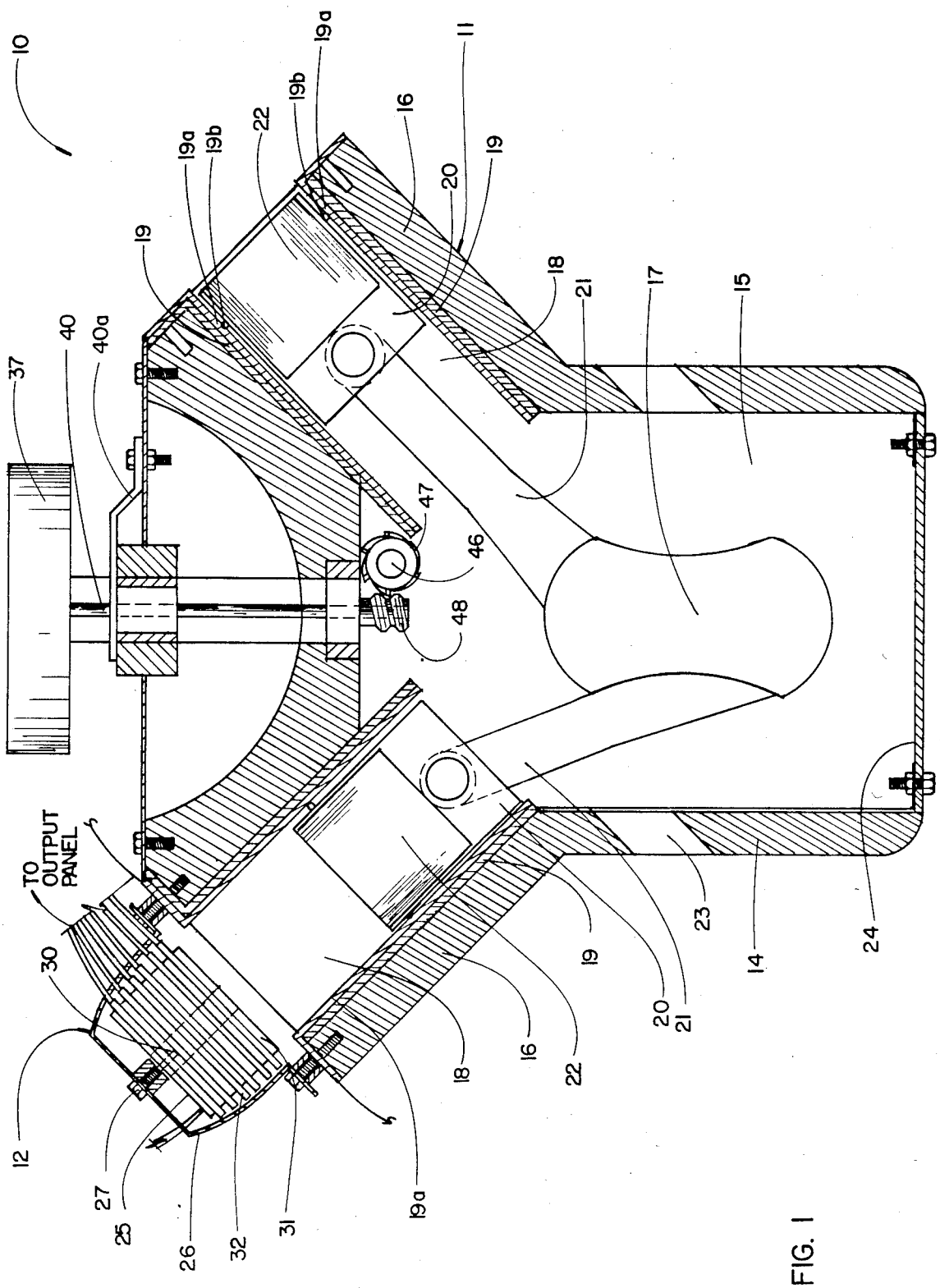
FIG. 1 is a sectional view of the magnetically actuated reciprocating engine of the present invention.

The low voltage power source also supplies power to the low voltage power directing unit 37 which actuates the anti-arc relay 36 to send timed pulses of high voltage current to the elctromagnets 25 and 22. The low voltage power directing unit 37 which is analogous to a distributor in an internal combustion engine, is mounted on engine block 14 and includes a drive shaft (FIG. 1), a rotor 41 (FIG. 2) and a plurality of switches 42, all suitably housed within a housing 43. The low voltage power directing unit 37 is held in place by a retaining clamp 40a which can be loosened to rotate the power directing unit 37 to achieve precise timing as will hereinafter be described in more detail.

Figure 2:
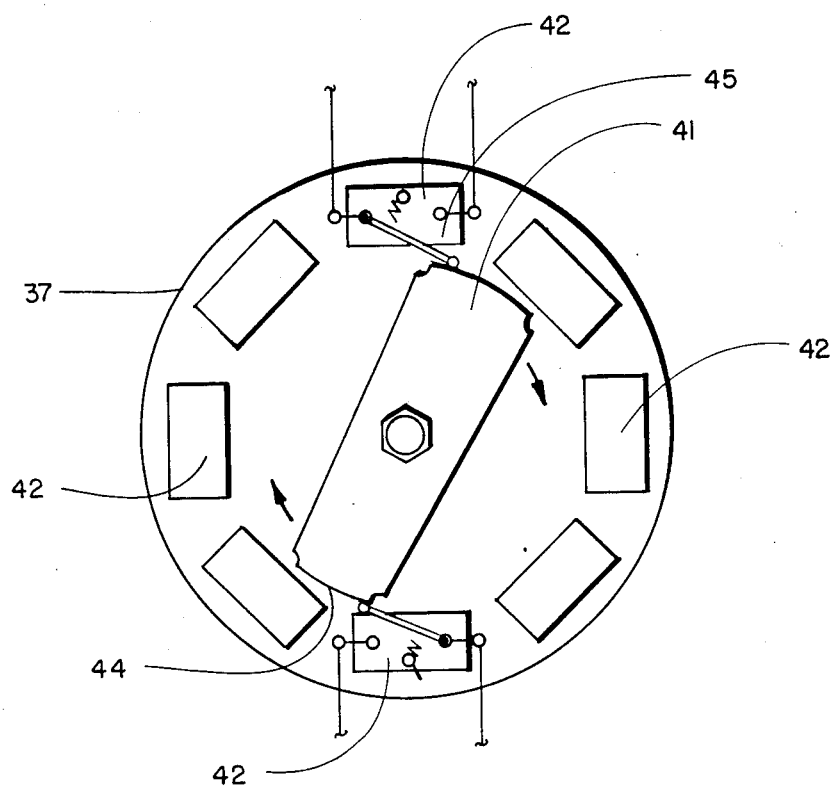
FIG. 2 is a somewhat schematic representation of the low voltage power directing unit.

Opposing switches 42 are connected through anti-arc relays 36 to the same set of electromagnets, one to the fixed electromagnet 25 and the other to the reciprocating electromagnet 22. (FIG. 3). As the rotor rotates, it simultaneously actuates opposing switches 42 as shown in FIG. 2 directing low voltage current to the anti-arc relays 36 thereby actuating the same. The anti-arc relays 36 in turn direct high voltage current to the electromagnets 25 and 22.

The rotor 41 is somewhat wedge-shaped in that one lobe 44 extends through an arc of approximately 30 degrees while the second lobe 45 extends through an arc of approximately 25 degrees. Thus, it is seen that one electromagnet will continue to be energized for a short period after the other has been de-energized.

The actuation of the electromagnets 25 and 22, of course, must be precisely timed with the movement of the corresponding piston 20 and thus the crankshaft 17. This is accomplished by means of a timing shaft 46 mechanically linking to the power directing unit's drive shaft 40. More particularly, the timing shaft 46 supported and secured within the engine crankcase 15 by sealed bearings and extends through the front of the engine block 14. The timing shaft 46 has an integrally formed worm gear 47 which meshes with a second worm gear 48 on the end of the low voltage power unit's drive shaft 40. A timing gear (not shown) is keyed to the end of the timing shaft 46 externally of the engine block 14. The timing gear is meshed with and driven by a crankshaft drive gear (not shown) keyed to the end of the crankshaft 17 extending from the front of the engine block 14.

The ratio between the worm gears 47 and 48 and the timing gear and crankshaft drive gear should be such that the rotor 41 makes one complete revolution every time the crankshaft makes two complete revolutions.

Since timing rotors and their associated drive means are well known to those skilled in the art, further detailed discussion thereof is not deemed necessary.

Figure 4:
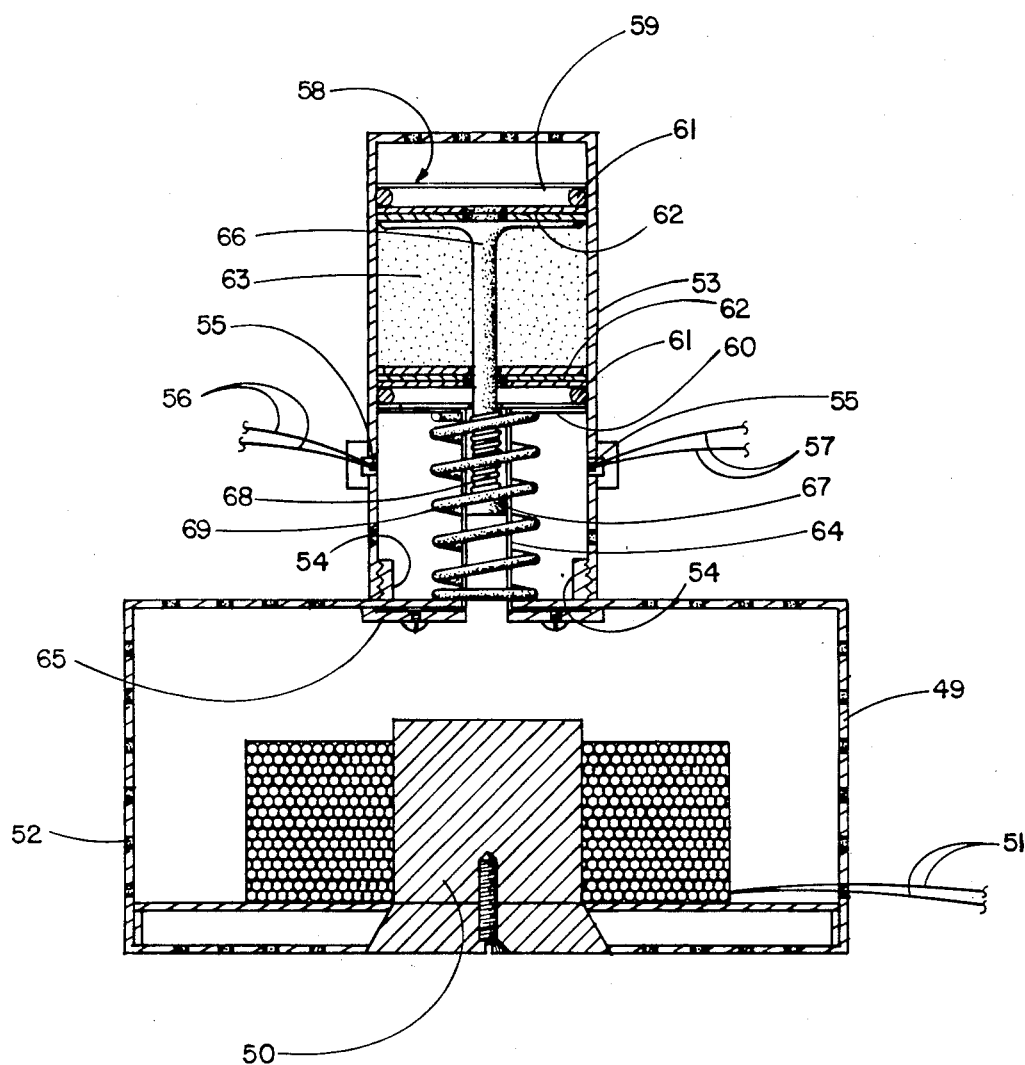
FIG. 4 is a sectional view of the high voltage anti-arc relay.

Referring now to FIG. 4, the high voltage anti-arc relay 36 is shown therein in detail. The anti-arc relay 36 includes a lower case 49 which houses an electromagnet 40. Electromagnet 50 is connected through leads 51 to a switch 42 in the low voltage power directing unit 37. A plurality of thermal vent holes 52 are formed in the lower case 49 to allow for air cooling of the electromagnet 50.

A glass case 53 is mounted on top of the lower case 49. The lower end of the glass case 53 is internally threaded and mates with an externally threaded circular flange 54 on the top of the lower case 49. Copper contacts 55 are implanted into the walls of the glass case on opposite sides thereof and are connected, respectively, to the high voltage leads 56 and 57. Electrical connection between the contacts 55 is made by the movement of a constant pressure piston 58 within the glass case 53 thereby completing the circuit and actuating electromagnet 25 or 22 as the case may be.

The piston 58 includes an upper plate 59 and a lower plate 60 which sealingly engage the walls of the glass case 53 by means of a rubber "O" ring 61 and teflon wiper ring 62. The area between upper and lower plates 59 and 60 is filled with liquid mercury 63, the purpose of which will hereinafter be described in detail.

A hollow shaft 64 extends from the lower plate 59, through an opening in the top of the lower case 49, where it joins with a slave wafer 65 made of soft iron or other ferrous material. It is noted that the slave wafer 65 is disposed directly above electromagnet 50 and in close proximity thereto. A piston return spring 69 is disposed about the hollow shaft 64 between the top of lower case 49 and the lower side of lower plate 60. The return spring 69 acts against piston 58 to bias the same to the upper portion of the glass case 53 as shown in FIG. 4.

A solid shaft 66 extends from the upper plate 59, through lower plate 60, and into the hollow shaft 64 where it terminates in an end cap 67. A constant pressure spring 68 is disposed about a solid shaft 66 between end cap 67 and the lower side of lower plate 59. Spring 68 tends to pull the upper and lower plates 59 and 60 together compressing the liquid mercury 63 there between until the pressure exerted by the mercury 63 equals the force exerted by the spring 68. The shaft 66, of course, is slidingly disposed with respect to lower plate 60 to allow for the expansion and contraction of the mercury 63.

When electromagnet 50 is actuated by the low voltage power directing unit 37, the attractive force created thereby acts on slave wafer 65 pulling the same downwardly towards electromagnet 50. The slave wafer 65 in turn pulls piston 58 downwardly within glass case 53 until the mercury 63 passes over the contact 55. At that time, high voltage current can flow between the contacts 55 through the mercury 63 thereby completing the circuit and actuating electromagnet 22 or 25 as the case may be. When electromagnet 50 is de-energized, return spring 69 pushes piston 58 upwardly breaking the high voltage circuit.

The high voltage anti-arc relay allows use of high voltage currents without incurring burned or fused contacts as is often the case with conventional relays.

To operate the electromagnetic engine 10 of the present invention it is necessary to first rotate the crankshaft 17. This is done by the simple application of power to the set of electromagnets energized by the Low Voltage Power Distribution Unit.

The operation of the engine 10 can best be described by reference to the stroke of a piston 20. When piston 30 starts its upward movement within cylinder 18, the rotor 41 actuates the corresponding switches 42 which in turn actuate the fixed electromagnet 25 and movable electromagnet 22 as heretofore described. The magnetic fields of the electromagnets create an attractive force which pulls the movable electromagnet 22 associated piston 20 upwardly. As the piston 20 reaches the top of its stroke one of the electromagnets (25 or 22) is de-energized as a result of rotor lobe 45 being smaller than lobe 44. When one electromagnet is de-energized its polarity is briefly reversed due to the counter electromotive force which results in a brief repelling force being exerted on electromagnet 22 which starts the piston 20 on its downward stroke. When the piston 20 reaches the bottom of its stroke and again starts its upward movement the rotor 41 will have turned 180 degrees and will again actuate switches 42. Thus, it is appreciated that the piston 20 will reciprocate up and down within cylinder 20 twice each time the rotor 41 makes one complete revolution.

The individual pistons 20 act in concert to keep the crankshaft 17 rotating in the same manner as a conventional internal combustion engine. The rotation of the crankshaft 17 can be used to drive an automobile or for any other purpose for which a conventional internal combustion engine could be used. Further, as long as the electromagnetic engine 10 is operating, the secondary coil 32 will produce alternating current which can be used to power virtually any electrical device.

From the foregoing, it is seen that the electromagnetic engine 10 of the present invention provides an alternative to gasoline powered engines and state of the art electrical power generators. It does not discharge polluting gases into the atmosphere or run the risk of releasing radioactive contaminants into the environment. The use of the magnetically engine actuated will result in the conservation of energy resources.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claim are intended to be embraced therein.

What is claimed is:

1. A magnetically actuated reciprocating engine comprising: an engine block including a crankcase; a crank shaft rotatably mounted within said crankcase; at least one cylinder formed in said engine block, said cylinder having insulated walls; a reciprocating pistion disposed in said cylinder; a connecting rod pivotably secured at one end to said piston and at its opposite end to said crank shaft to rotate said crank shaft as said piston reciprocates within said cylinder; a first movable electromagnet secured to said piston; a second stationary electromagnet disposed above said cylinder; a power source for energizing said electromagnets; means for establishing an electrical connection between said power source and said first electromagnet, said connecting means including a switch, a pair of conductive strips secured to said insulated cylinder walls and extending in a direction parallel to the longitudinal axis of said cylinder, and a pair of electrical contacts secured to said piston and slidably engaging respective conductive strips; means for establishing an electrical connection between said power source and said second electromagnet, said connecting means including a switch; and timing means for actuating said switches in timed relationship to energize said electromagnet and create attractive and repelling forces for driving said piston within said cylinder.

* * * * *